Jan. 13, 1953  G. BRERETON  2,624,918
RAMIE PROCESSING APPARATUS
Filed Nov. 18, 1947  5 Sheets-Sheet 4
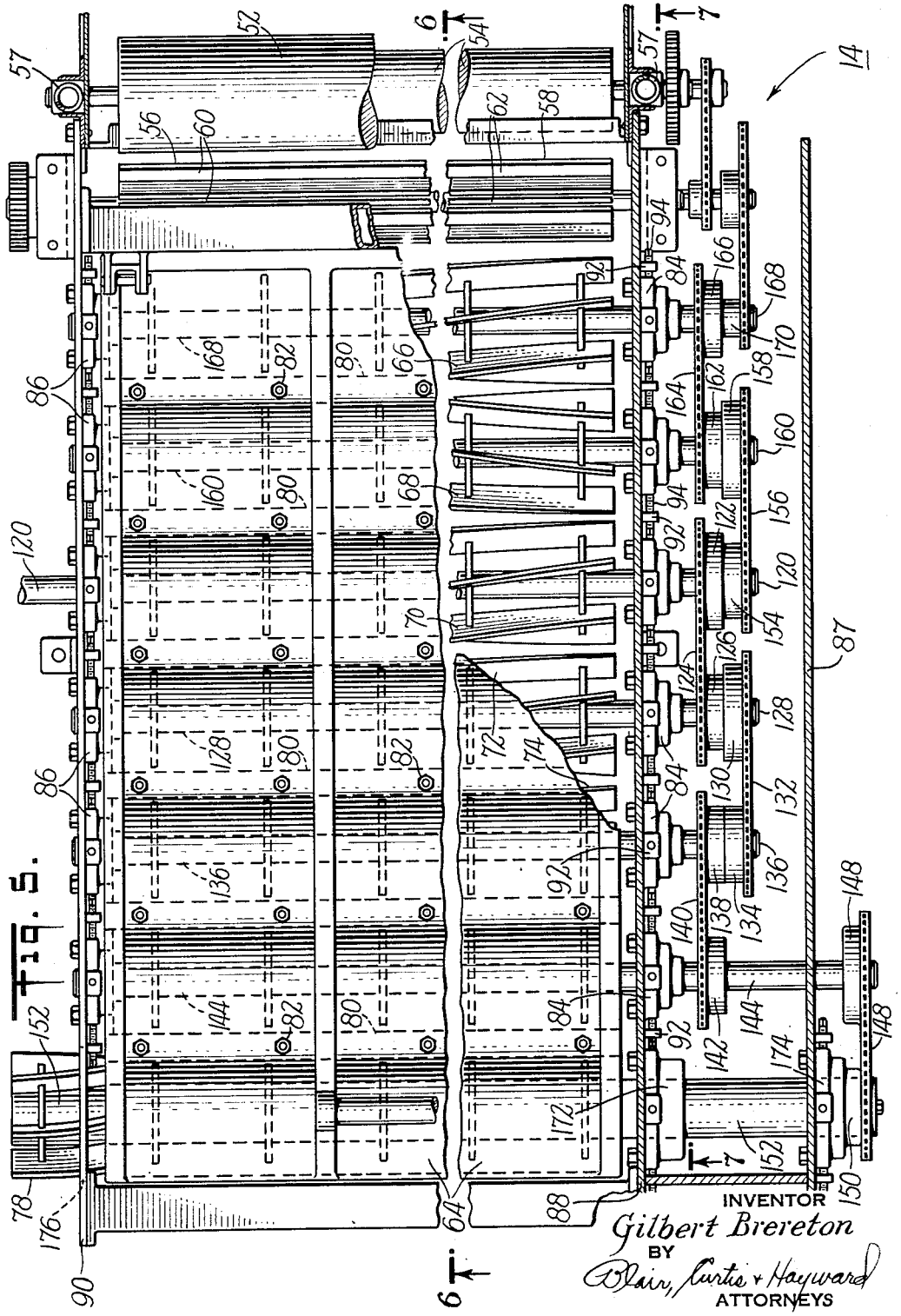
INVENTOR
Gilbert Brereton
BY
Blair, Curtis + Hayward
ATTORNEYS

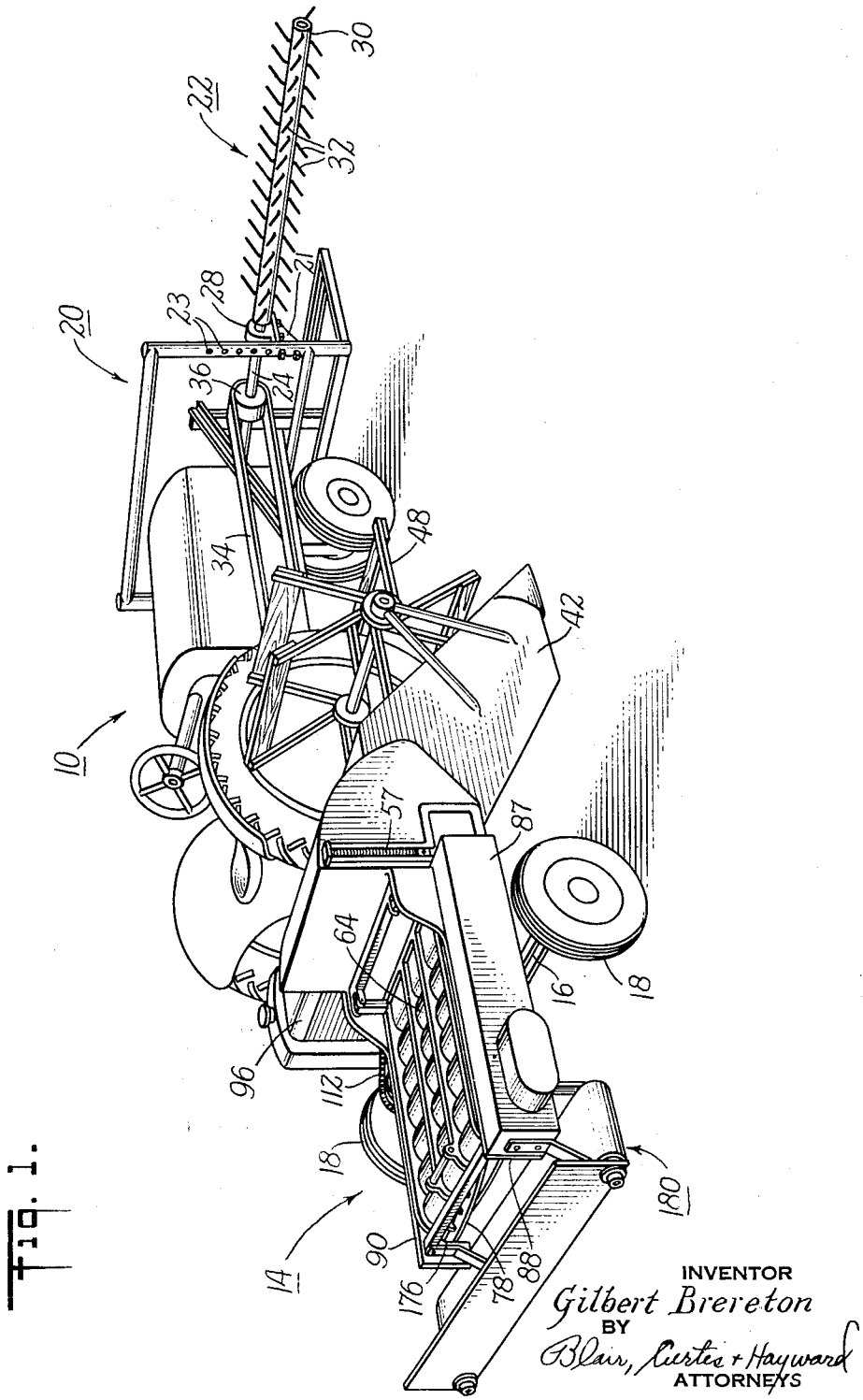

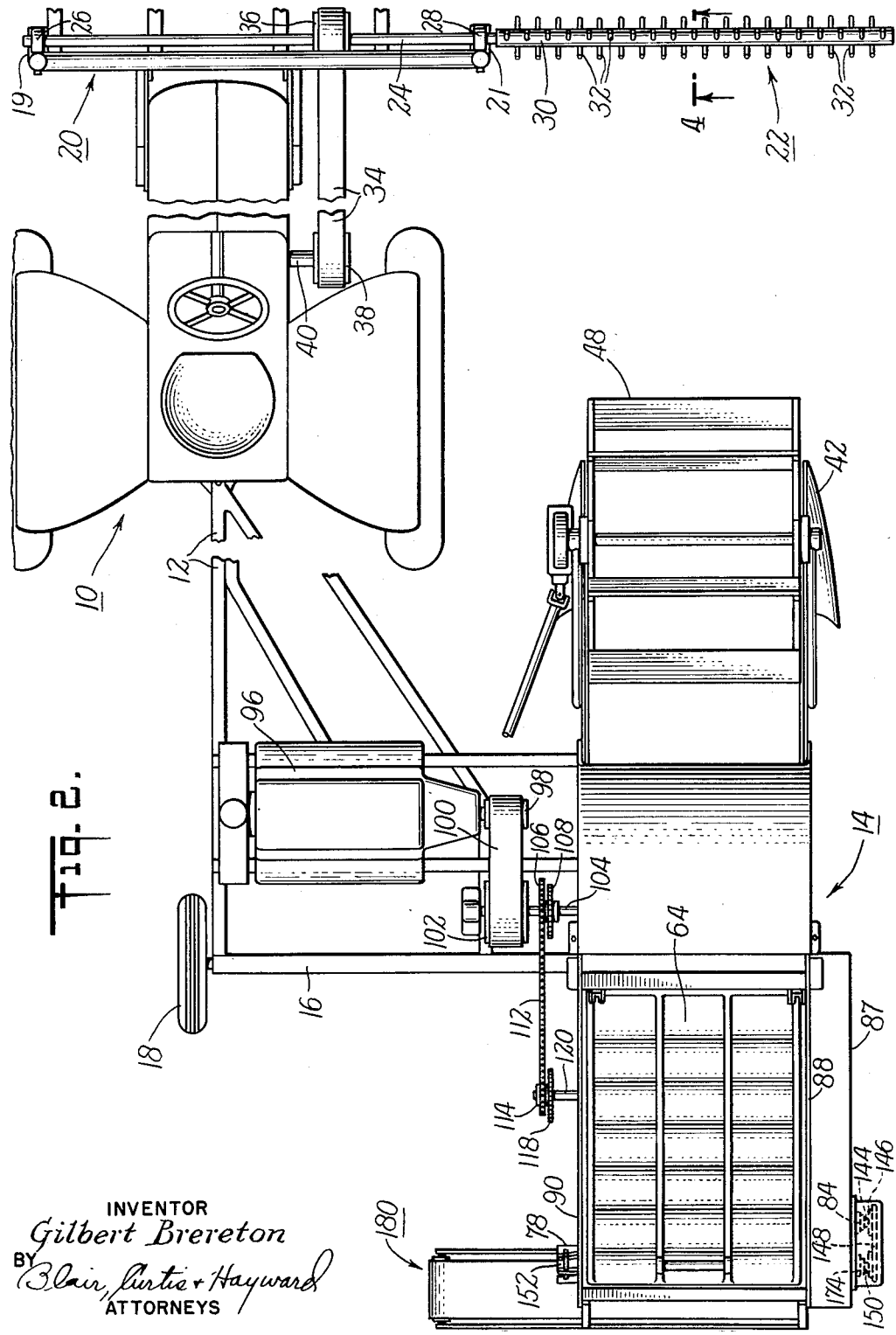

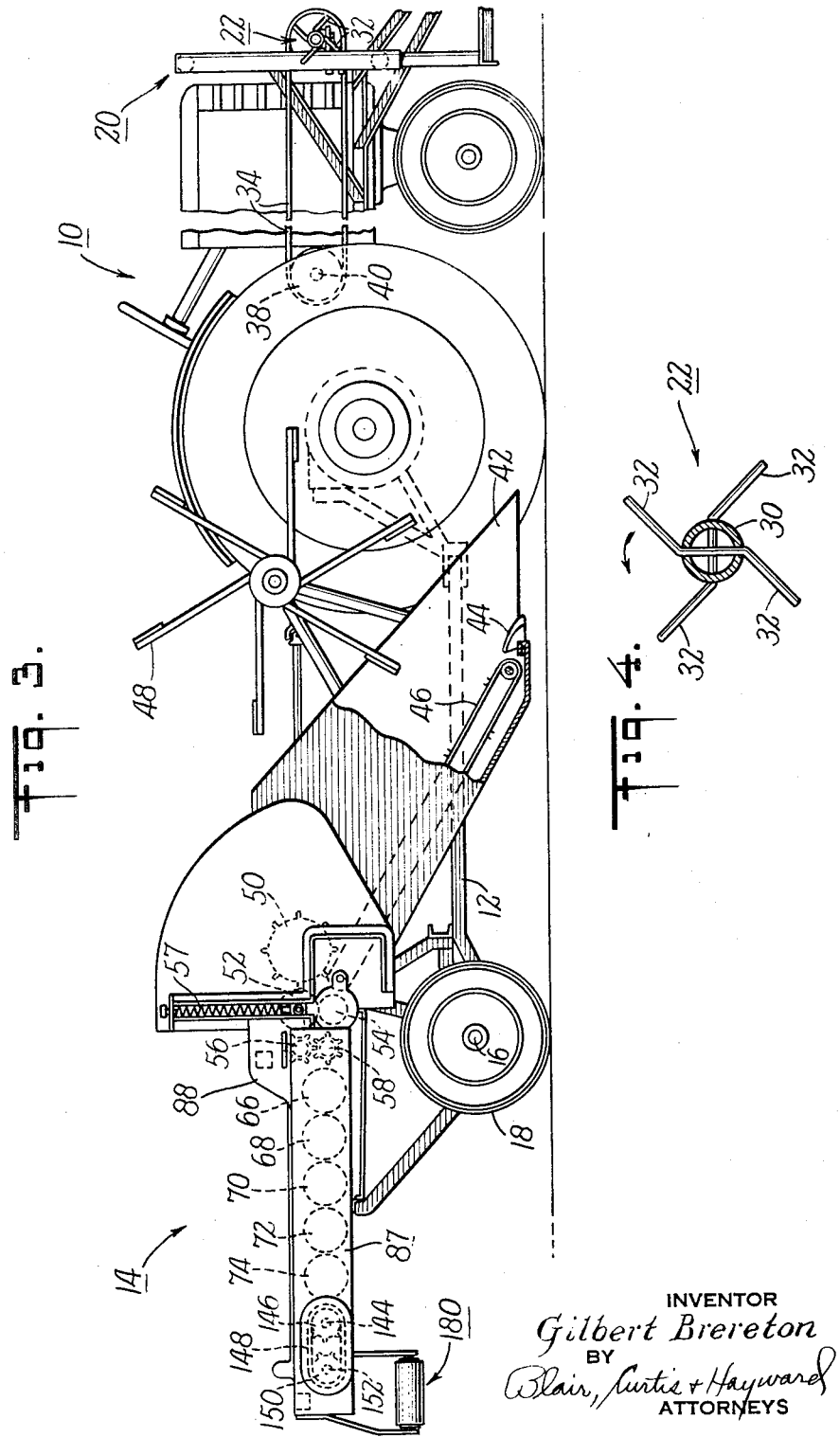

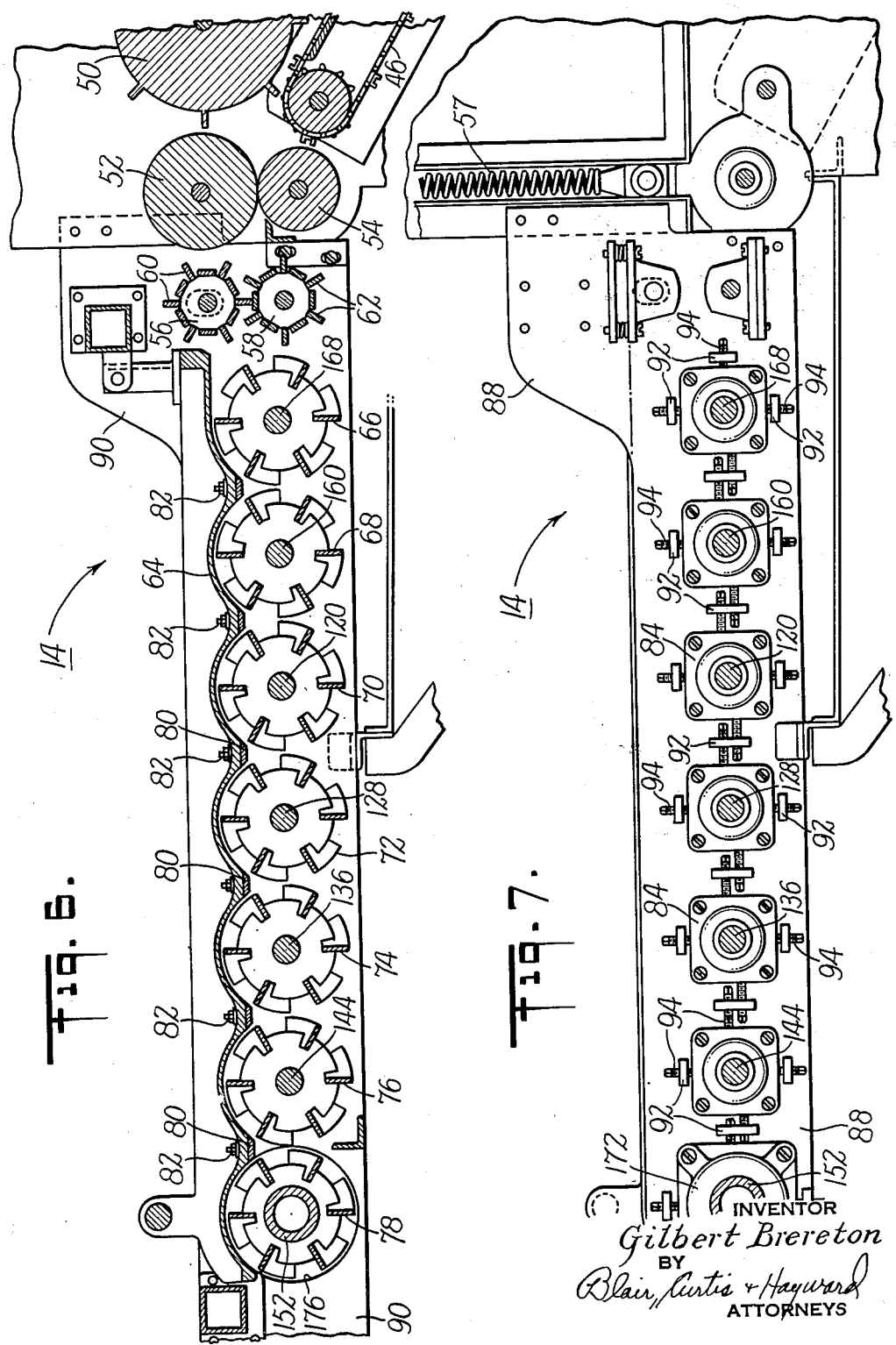

Patented Jan. 13, 1953

2,624,918

UNITED STATES PATENT OFFICE 2,624,918

RAMIE PROCESSING APPARATUS

Gilbert Brereton, Toronto, Ontario, Canada, assignor to Eimar Corporation, New York, N. Y., a corporation of Delaware Application November 18, 1947, Serial No. 786,663

5 Claims. (Cl. 19—30)

This invention relates to the harvesting and decorticating of ramie plants and the like to liberate and recover useful fibres therefrom, and more particularly to an improved apparatus for liberating ramie fibre-containing ribbon from the leaves, bark, pulp and gum with which it is naturally associated in the growing plant.

It has been recognized for many years that the fibres of the ramie plant possess peculiarly useful properties that make them valuable for many purposes. The fibres are unusually strong, tough and durable, and hence may be used with advantage in many applications where rugged fibres are required such as, for example, in rope, automobile tires, upholstery, floor coverings, bag material and the like. Ramie fibre when degummed and processed may be used in the manufacture of cloth for a variety of purposes, such as for all varieties of threads, cloth, either pure or blended with other materials, canvas of all weights, packing for glands and other uses.

The ramie plant grows readily in many areas and grows very rapidly so that ample supplies of raw materials are available at low cost. However, extensive use of the ramie fibre has been retarded by the difficulties encountered in liberating the fibre and/or ribbon from the plant. The fibres as they occur naturally are encased in a tough bark and bound together by a resistant gum that is difficult to remove to the desired extent. Numerous efforts have been made to provide a satisfactory decorticating machine for separating the ramie fibre and/or ribbon from the stalks, but so far as I am aware no previously proposed machine has been completely satisfactory in effecting such a separation.

It is accordingly an object of the present invention to provide a method and apparatus for more effectively and economically liberating useful fibres from the ramie plant. It is another object of the invention to provide a combined harvester and decorticator for operating on the ramie plants in situ, by continuously deleafing the plants, cutting the stalks, breaking and crushing the woody pulp of the stalks without injury to the fibre, and scraping the stalks in the field to separate effectively a fibrous ribbon from the woody pulp with which it is so intimately associated in the growing plant. Other objects of the invention will be in part obvious and in part pointed out hereafter.

In one of its broader aspects the method of the present invention comprises the steps of successively deleafing ramie plants in situ in a field of ramie, cutting the ramie stalks, crushing the stalks to break the wood and pulp into sections of predetermined length, and scraping the stalks to remove the pulp and outer skin from the fibres and/or ribbon thereof. I have found that if the cut ramie is fed to the decorticator without preliminary deleafing, the leaves of the plant tend to clog the decorticator and interfere with the separation of the pulp and outer skin or bark from the ramie fibres and/or ribbon. If, on the other hand, the leaves are removed before the stalks are fed to the decorticator the total quantity of undesired portions of the plant to be removed in the decorticator is substantially reduced, and hence a much finer separation between the fibres and/or ribbon and impurities may be obtained in the decorticator.

I have also found that the deleafing of the ramie plant may be advantageously effected in situ, that is, prior to the time the ramie stalks are cut. By carrying out the deleafing operation prior to cutting, it is possible to make use of the fact that the ramie stalks are firmly held at one end by their roots, and hence the leaves may be effectively stripped from the plant without the use of any artificial means for holding the stalks in stripping position. Thus a substantial advantage is gained by carrying out the deleafing operation prior to the cutting of the stalks.

Further, I have found that by operating on the ramie plants in the field to separate the fibres and/or ribbon from the bark, woody pulp and gum by crushing, breaking and scraping the stalks immediately after the plants have been deleafed and cut, it is possible to return directly to the soil the separated non-fibrous portions of the ramie plant, i. e., the leaves, woody pulp, bark and gum, which constitutes approximately 90% of its weight. This not only provides a green mulch for the fields which tends to maintain their fertility, but also renders ramie harvesting and decorticating commercially feasible by making it necessary only to remove approximately 10% of the weight of the crop from the place where it was grown. This permits a substantial saving in labor and transportation costs, one of the serious handicaps to ramie production in the past.

In addition, I have found that this immediate processing of the ramie fibres in situ improves and simplifies the decortication of the ramie fibres by providing no time for the liquids liberated during the processing operations to harden under the action of sun and air and render the stalks and fibres sticky and brittle.

Other apparent objects and advantages of the present invention will be in part obvious and in part pointed out hereinafter.

In order to point out more fully the nature of the present invention, reference will be made to the accompanying drawings which illustrate apparatus incorporating a preferred embodiment of the apparatus of the invention, and capable of carrying out the method of the invention. In the drawings:

Figure 1 is a perspective view of a combined harvesting and decorticating machine;

Figure 2 is a general plan view of the machine of Figure 1;

Figure 3 is a general side view of the same machine;

Figure 4 is a vertical section through the deleafing portion of this machine taken on line 4—4 of Figure 2;

Figure 5 is a top plan view of the decorticating portion of this machine, partly broken away to show the arrangement of the revolving scraper cylinders;

Figure 6 is a vertical section through the decorticator taken on the line 6—6 of Figure 5 and showing the arrangement of the revolving scrapers with respect to the scraper plate; and Figure 7 is a section taken on the line 7—7 of Figure 5 and showing the adjusting means for adjusting the position of the scraper cylinders.

Referring to the drawings, and more particularly to Figures 1 and 2, the harvesting and decorticating machine of the present invention comprises generally a tractor 10 of conventional construction which is connected by a yoke 12 to a mobile mower-decorticator unit 14 mounted on an axle 16 having wheels 18. The yoke 12 is shown as broken in Figure 2 to indicate that tractor 10 is normally positioned farther in advance of the unit 14 than indicated in Figure 2. The unit 14 is offset from the tractor 10 as shown in Figures 1 and 2 so that as tractor 10 is driven through a field of ramie the mower cuts a swath through the ramie in the field.

Fixed to the front of the tractor 10 is a frame 20 which supports a deleafer 22 extending laterally from the tractor 10 in front of the mower-decorticator unit 14. The deleafer 22 comprises a rotatable shaft 24 that is cantilever-mounted in bearings 26 and 28 which are adjustably fixed to the frame 20, and a tubular deleafing arm 30 that extends laterally from the end of shaft 24. The bearings 26 and 28 are bolted to the supporting members 19 and 21 respectively which are in turn bolted to the frame 20 through the holes 23 in the frame. Thus the height of the deleafer above the ground may be adjusted to take care of variations in the average height of the ramie stalks in different fields or different portions of the same field.

The deleafing arm 30, as is best shown in Figure 4, is provided with pins 32 that extend outwardly from the surface of the deleafing arm 30 and are bent at an angle thereto in a clockwise direction. The deleafer 22 is driven by the tractor motor (see Figures 1 and 2) from a pulley 38 fixed to a power shaft 40 of the tractor by means of a belt 34 and a pulley 36 on deleafer shaft 24. As the tractor 10 is driven through the field of ramie the deleafer 22 is rotated in a counterclockwise direction (as seen in Figures 3 and 4) to strip the leaves from the ramie stalks before they are cut, but because of its advantageous construction it does so easily without breaking the stalks or pulling the plants out by the roots.

Referring now to Figure 3, the mower-decorticator unit 14 comprises a trough 42 having mounted near the lower forward end thereof a conventional cutter bar 44. Within the trough 42 there is a conveyor 46 that conveys the cut ramie stalks from the cutter bar 44 to the decorticator apparatus. A rotatable reel 48 is mounted in the usual manner above the cutter bar 44 to assist in guiding the cut stalks onto the conveyor 46. The cut stalks travel upwardly on the conveyor 46 and at the top of the conveyor are fed by a guide roll 50 between two crusher rolls 52 and 54. The crusher roll 52 is spring-pressed by a spring 57 downwardly against roll 54 which is fixed, and the tension of spring 57 preferably is adjustable to determine the pressure that roll 52 exerts on the cut stalks.

Referring now to Figure 6 of the drawings, the cut stalks, after leaving the crusher rolls 52 and 54, pass between a pair of rotatable breaker rolls 56 and 58 which are of similar construction and are provided, respectively, with spaced radial arms 60 and 62. As shown in Figure 6, the rolls 56 and 58 are so positioned with respect to one another that each of the radial arms 60 on roll 56 is opposite a space between a pair of arms 62 on roll 58, and vice versa. Thus, as the stalks pass between the breaker rolls 56 and 58, the woody pulp is broken into sections of predetermined length without injury to the ramie fibre ribbon.

After leaving the breaker rolls 56 and 58, the stalks are fed between a scraper plate 64 and a series of revolving scraper cylinders 66, 68, 70, 72, 74, 76 and 78. The scraper plate 64, as shown in Figure 6, is sinuously curved in such a manner that its under surface conforms with the curvature of the upper portions of scraper cylinders 66—78, and the scrapper cylinders (as is best shown in Figure 5) are provided with helical, i. e., "lawn mower" blades. The scrapers 66—78 are rotated in a counterclockwise direction (as shown in Figure 6) and the helical blades of these scraper cylinders cooperate with the under surface of the scraper plate 64 to scrape the stalks passing therebetween.

The curvature of the helical blades is such that the stalks are rotated about their axes as they pass through the decorticator, and thus all sides of the stalk are effectively scraped. Due to this helical curvature of the blades of the scraper cylinders 66—78 there is some tendency for the stalks to work their way toward one side of the machine as they pass therethrough. To offset this tendency, the blades of scraper cylinder 68 (see Figure 5) are curved in a reverse sense.

Fixed to the scraper plate 64 at points between the scraper wheels 66—78 are a series of scraper bars 80 of approximately trapezoidal cross-section that are bolted to the scraper plate by the bolts 82. The lower corners of these scraper bars 80 are machined to form sharp edges and the scraper bars are made of a relatively hard metal so that they provide a supplementary scraping action on the stalks as they pass between the scraper plate and the scraper cylinders. Since the scraper bars 80 are bolted to scraper plate 64 they may be easily removed for sharpening or replacement.

The positions of the scraper cylinders 66—78 are adjustable with respect to the scraper plate 64. The arrangement for accomplishing this is best shown in Figures 5 and 7. At their ends, the scraper cylinders are mounted in adjusting plates 84 and 86 that are bolted, respectively, to the side walls 88 and 90 of the decorticator. Adjacent to each side of the adjusting plates 84 there is an adjusting block 92 that is fixed to the side wall 88 of the decorticator. Adjusting screws 94 are threaded through these adjusting blocks 92 and into the adjusting plates 84 in such manner that rotation of the adjusting screws 94 shifts the position of the plates 84, and hence the positions of the scraper cylinders with respect to the scraper plate 64. The adjusting plates 86 are provided with adjusting blocks and adjusting screws similar to the blocks 92 and screws 94 of the plates 84.

Referring now again to Figure 2, the scraper cylinders 66—78, breaker rolls 56 and 58, and crusher rolls 52 and 54 are driven by a motor 96 mounted on the yoke 12. Motor 96 drives a pulley 98 connected by a belt 100 to a pulley 102 on a shaft 104. The shaft 104 carries two sprockets 106 and 108 of varying diameter which may be connected by a chain 112 to one of the sprockets 114 and 116 of varying diameter mounted on a shaft 120 which is the shaft of the scraper 70. The construction is such that the belt 112 may be used to selectively connect the sprocket pairs 106 and 114, or 108 and 116 to change the speed of operation of the decorticator.

The scrapers 66, 68 and 72—78, as well as the crusher rolls and breaker rolls all are driven from the shaft 120 of scraper cylinder 70. Referring to Figure 5 of the drawings, the shaft 120 of this scraper 70 is provided with a sprocket 122 connected by an endless chain 124 to a sprocket 126 on shaft 128 of scraper 72, and shaft 128 also carries a sprocket 130 connected by a chain 132 with a sprocket 134 on the shaft 136 of scraper 74. Shaft 136 also carries a sprocket 138 connected by a chain 140 to a sprocket 142 on the shaft 144 of scraper 76. Shaft 144, and also shaft 152 of scraper 78, extend beyond an outer side wall 87 of the decorticator and at their outer ends are provided respectively with the sprockets 146 and 150 that are connected by the chain 148.

Shaft 120 of scraper 70 also carries a sprocket 154 connected by a chain 156 with a sprocket 158 on shaft 160 of scraper 68. Shaft 160 also carries a sprocket 162 connected by a chain 164 with a sprocket 166 mounted on the shaft 168 of scraper 66. Shaft 168 carries a sprocket 170 which, through intermediate chains and sprockets, drives the breaker rolls 56 and 58 and the crusher rolls 52 and 54.

The sprockets 122, 126, 130, 134, 138, 142, 146, 150, 154, 158, 162, 166 and 170 preferably are made of such size that the speeds of the scraper cylinders 66—78 increase as the ramie stalks move through the decorticator. This keeps the ramie ribbon fibre taut and prevents clogging of the ribbon. I have found that it is desirable to cause the scraper 66 to operate at a speed that is approximately twice that of the crusher and breaker rolls and to cause the successive scraper cylinders each to have a speed that is approximately 12% greater than the speed of the next preceding scraper. However, it is not essential that each scraper be rotated at a higher speed than the next preceding scraper since the decorticator may be in effect divided into sections in which each section contains two or more scraper wheels rotated at the same speed. For example, in a representative case the breaker rolls might rotate at 220 R. P. M.; the scrapers 66 and 68 at 455 R. P. M.; scraper 70 at 540 R. P. M.; scraper 72 at 640 R. P. M.; and the scrapers 74, 76 and 78 at 760 R. P. M. By increasing the speeds of the scrapers as the stalks pass through the decorticator, a greater relative movement of the stalks and scrapers is obtained, and hence more effective scraping of the stalks is accomplished. Increasing the speeds of the scrapers also helps dispose of the undesirable woody pulp previously broken in the breaker rolls.

As the decorticated fibres pass out of the decorticator over the last scraper 78 they drop on a conveyor generally indicated at 180, disposed across the back of the decorticator to carry the fibres to one side of machine for removal to a truck, baler or other apparatus for conveyance to a fibre degumming plant.

It has been found that there is some tendency for fibres reaching the final scraper cylinder 78 of the series to pass around the scraper and become entangled thereon. Because of the helical shape of the blades of the scrapers, these entangled fibres gradually work their way toward the side wall 90 of the decorticator and tend to jam the machine unless some means be provided for removing such entangled fibres. To effect the removal of such entangled ramie ribbon fibres, the last scraper 78 is preferably cantilever-mounted, thus providing a free end over which ramie ribbon fibres may be discharged. Referring to Figure 5, the shaft 152 of scraper 78 is mounted in the bearing 172 fixed to side wall 88 and the bearing 174 fixed to side wall 87 and is unsupported at its other end adjacent the side wall 90. The shaft of scraper cylinder 78 is preferably made larger in diameter than the shafts of the other scraper cylinders to provide the additional support required because of the cantilever mounting of the cylinder 78. This may be accomplished advantageously by making this shaft of large tubing as shown in Figure 6. Referring to Figure 5 the end of this scraper 78 passes through a hole 176 in the side wall 90 of the decorticator. Since this scraper 78 has a free end, entangled ramie ribbon fibres or wrapped ribbon can be discharged over this free end. Thus this cantilever mounting of the last scraper 78 permits automatic and continuous removal of entangled fibres or wrapped ribbon therefrom.

The operation of the above-described apparatus is largely apparent from its description. The tractor 10 is driven along a field of ramie and the deleafer 30 is rotated to strip leaves from the ramie stalks before they are cut. As the tractor 10 proceeds through the field, the deleafed stalks are cut by the cutter bar 44 and carried by the conveyor 46 upwardly into the decorticator structure. The stalks pass between the crusher rolls 52 and 54 and then between the breaker rolls 56 and 62 wherein the pulp is broken up into sections of predetermined length. From the breaker rolls 56 and 62 the stalks pass between the scraper plate 64 and the scraper cylinders 66—78 and the pulp is scraped from the ramie ribbon fibres by the cooperative action of these scrapers, scraper plate 64, and scraper bars 80. The clean ramie ribbon fibres are discharged from the final scraper 78 of the decorticator onto the conveyor 180.

Since the ramie stalks are deleafed in situ before they are cut, the stalks fed to the decorticator are relatively clean and clogging of the machine by the ramie leaves is avoided. Moreover, when deleafed stalks are fed to the decorticator, the scrapers can be set closer to the scraper plate, and a nicer separation of the fibres and impurities accomplished by the decorticator. Thus the separate deleafing operation permits a cleaner fibre to be produced. Similarly, the complete and immediate processing of the plants in the field permits the production of cleaner and more easily handleable fibres with such efficiency that these fibres can be produced sufficiently economically to compete commercially with other fibres.

It is, of course, to be understood that the apparatus described is illustrative only and may be modified in various ways within the scope of the invention. For example, the tractor 10 may be omitted and the motive means for the unit incorporated in the harvester-decorticator.

Since many embodiments might be made of the present invention and since many changes might be made in the embodiment disclosed herein, it is to be understood that the foregoing description is to be interpreted as illustrative only and not in a limiting sense.

I claim:

1. In a ramie harvesting and decorticating machine, a mobile decorticator comprising, in combination, a pair of breaker rolls for breaking the pulp of ramie stalks into sections of predetermined length, a scraper plate, a series of rotary scrapers confronting one side of said scraper plate and driving means for driving said rotary scrapers to cause said ramie stalks to pass between said scrapers and said plate to remove pulp, bark and gum from said stalks, the last scraper of said series of scrapers being cantilever-mounted to cause fibres that pass around said last scraper to be discharged from the free end thereof.

2. In a ramie harvesting and decorticating machine, in combination, a series of cylindrical rotary scrapers having a length greater than their diameter, scraper plate means for cooperating with said scrapers to cause said scrapers to scrape stalks of ramie passing between said scraper plate means and said scrapers, the last scraper of said series being cantilever-mounted to provide a free end over which ramie fibres becoming wrapped on said last scraper can be discharged from said machine.

3. In a ramie harvesting and decorticating machine, in combination, a series of cylindrical rotary scrapers having a length greater than their diameter, scraper plate means for cooperating with said scrapers to cause said scrapers to scrape stalks of ramie passing between said scraper plate means and said scrapers, the last scraper of said series being provided with heliical scraper blades and being cantilever-mounted to cause ramie fibres that become wrapped on said last scraper to be discharged from one end thereof.

4. In a mobile harvester and decorticator unit for harvesting and decorticating ramie and the like in a field in combination, a pair of crusher rolls for crushing cut ramie stalks, a pair of breaker rolls to break the pulp of said stalks into sections of predetermined length, a scraper plate, a series of rotary scrapers for cooperating with said scraper plate to scrape said stalks to remove the pulp, bark and gum therefrom, the last scraper of said series being cantilever-mounted to provide a free end over which ramie fibers becoming wrapped on said last scraper can be discharged from said machine and a wheeled carriage supporting said crusher and breaker rolls and said scraper plate and scrapers.

5. In a mobile harvester and decorticator unit for harvesting and decorticating ramie and the like in a field in combination, a wheeled carriage, a pair of crusher rolls mounted on said carriage for crushing cut ramie stalks, a pair of breaker rolls mounted on said carriage to break the pulp of said stalks into sections of predetermined length, a scraper plate supported on said carriage, a series of cylindrical rotary scrapers rotatably mounted in said carriage and confronting one side of said scraper plate and driving means for driving said rotary scrapers to cause stalks from said breaker rolls to pass between said scrapers and said plate to remove pulp, bark and gum from said stalks, the last scraper of said series being cantilever-mounted to provide a free end over which fibers becoming wrapped on said last scraper can be discharged from said machine.

GILBERT BRERETON.

REFERENCES CITED

The following references are of record in the file of this patent:

UNITED STATES PATENTS

| Number | Name | Date |
|---|---|---|
| 358,827 | Angell | Mar. 8, 1887 |
| 1,255,769 | Michael | Feb. 5, 1918 |
| 1,265,244 | Pratt | May 7, 1918 |
| 1,308,267 | Stewart | July 1, 1919 |
| 1,410,416 | Shely | Mar. 21, 1922 |
| 2,179,584 | Bourg, Sr. | Nov. 14, 1939 |
| 2,208,287 | Cochrane | July 16, 1940 |
| 2,231,040 | Wessel | Feb. 11, 1941 |
| 2,264,236 | Bokum et al. | Nov. 25, 1941 |
| 2,280,453 | Rucker et al. | Apr. 21, 1942 |
| 2,427,155 | Nisbet, Sr. | Sept. 9, 1947 |
| 2,443,296 | Brereton | June 15, 1948 |